United States Patent
Suzuki et al.

(10) Patent No.: US 9,578,531 B2
(45) Date of Patent: Feb. 21, 2017

(54) METHOD AND SYSTEM FOR INDICATING FREQUENCY FOR REPORTING A GERAN CGI

(71) Applicant: BLACKBERRY LIMITED, Waterloo (CA)

(72) Inventors: Takashi Suzuki, Ichikawa (JP); Andrew John Farnsworth, Kidderminster (GB); Ayman Ahmed Mahmoud Abdel-Samad, Waterloo (CA); Dinesh Kumar Arora, Kitchener (CA); Mohamed Galal El-Din Ebrahim, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 629 days.

(21) Appl. No.: 13/827,440

(22) Filed: Mar. 14, 2013

(65) Prior Publication Data
US 2014/0087715 A1    Mar. 27, 2014

Related U.S. Application Data

(60) Provisional application No. 61/706,731, filed on Sep. 27, 2012.

(51) Int. Cl.
*H04W 24/10* (2009.01)

(52) U.S. Cl.
CPC ................... *H04W 24/10* (2013.01)

(58) Field of Classification Search
CPC .................................................. H04W 24/10
USPC ..................................................... 455/422.1
See application file for complete search history.

(56) References Cited

U.S. PATENT DOCUMENTS

| | | | |
|---|---|---|---|
| 2005/0114089 A1* | 5/2005 | Celestini ............ | G05B 23/0221 702/186 |
| 2010/0297955 A1* | 11/2010 | Marinier ........... | H04W 36/0061 455/73 |
| 2010/0323631 A1* | 12/2010 | Martin ............... | H04B 17/0067 455/67.11 |
| 2011/0070897 A1* | 3/2011 | Tang ..................... | H04W 24/02 455/456.1 |
| 2012/0015681 A1* | 1/2012 | Dalsgaard ............. | H04W 48/08 455/517 |

(Continued)

FOREIGN PATENT DOCUMENTS

WO    2011096692 A2    8/2011

OTHER PUBLICATIONS

3GPP TS36.300 "Evolved Universal Terrestrial Radio Access (E-UTRA) and Evolved Universal Terrestrial Radio Access Network (E-UTRAN) Overall description Stage 2", v.11.3.0, Sep. 26, 2012.

(Continued)

*Primary Examiner* — Qun Shen
(74) *Attorney, Agent, or Firm* — Moffat & Co.

(57) ABSTRACT

The present disclosure provides for methods and systems for indicating a frequency for reporting a GERAN CGI. These include the relaxation of the single measurement object per frequency principle; an indication of ARFCN for CGI reading; measurement interruption avoidance; implicit indications of ARFCN for CGI reading; the use of a different object than a measurement object to report the cell for which to report the CGI; the use of a measurement configuration report to indicate the CGI cell or the selection of an ARFCN using to find rules at the UE.

20 Claims, 10 Drawing Sheets

(56) References Cited

U.S. PATENT DOCUMENTS

| | | | | |
|---|---|---|---|---|
| 2012/0033595 A1* | 2/2012 | Aoyama | ............. | H04W 76/048 370/311 |
| 2012/0088508 A1* | 4/2012 | Matsuo | ................ | H04W 24/10 455/436 |
| 2012/0244905 A1* | 9/2012 | Zhao | ....................... | H04L 5/001 455/517 |
| 2013/0005339 A1* | 1/2013 | Iwamura | ............... | H04W 48/20 455/436 |
| 2014/0220963 A1* | 8/2014 | Jung | .................... | H04W 48/16 455/422.1 |

OTHER PUBLICATIONS

3GPP TS36.331 "Evolved Universal Terrestrial Radio Access (E-UTRA) Radio Resource Control (RRC)" Protocol specification, v. 11.1.0, Sep. 26, 2012.

3GPP TSG-RAN WG2 #79, R2-123923 "On cellForWhichToReportCGI for GERAN cells", Ericsson, ST-Ericsson, Aug. 2012.

International Search Report on International Application No. PCT/EP2013/069881, mailed Mar. 27, 2014.

Catt, 3GPP TSG RAN WG2 #63bis R2-085212, Prague, Czech Republic, Sep. 29- Oct. 3, 2008, "Action of VarMeasurementReports after measurement configuration change."

Research in Motion UK Ltd., 3GPP TSG-RAN WG2 Meeting #79bis, R2-124458, Bratislava, Slovakia, Oct. 8-13, 2012, "Measurements interruption upon report CGI configuration."

Research in Motion UK Ltd., 3GPP TSG-RAN WG2 Meeting #79bis, R2-124457, Bratislava, Slovakia, Oct. 8-13, 2012, "Reporting CGI of a GERAN cell."

Research in Motion UK Ltd., 3GPP TSG-RAN WG2 Meeting #80, R2-125473, New Orleans, U.S.A., Nov. 12-16, 2012, "Issues with reporting CGI."

Antti Toskala et al. :"LTE Radio Protocols" in "LTE for UMTS: Evolution to LTE-Advanced," Mar. 4, 2011, John Wiley and Sons, Ltd, ISBN: 978-0-047-66000-3, p. 141-184.

* cited by examiner

METHOD AND SYSTEM FOR INDICATING FREQUENCY FOR REPORTING A GERAN CGI

FIELD OF THE DISCLOSURE

The present disclosure relates to measurement reporting between a User Equipment (UE) and a network element and in one embodiment relates to measurement reporting between a UE and an Evolved Universal Terrestrial Radio Access Network (E-UTRAN).

BACKGROUND

A UE may be required to report certain information to a network in accordance with a measurement configuration provided by the network. For example, in a Long Term Evolution (LTE) environment, a measurement configuration may be provided by the E-UTRAN, and may use dedicated signaling such as an RRCConnectionReconfiguration message when the UE is in an RRC_CONNECTED state. The measurement information may be provided to facilitate handover when the UE is approaching a cell boundary or may be used for other functionality including automatic neighbor relations functions.

Using Third Generation Partnership Project (3GPP) E-UTRAN specifications, the measurement information may be provided based on measurement objects. Measurement objects are objects on which the UE performs measurements and, in some embodiments, are restricted such that only one measurement object exists for a particular frequency.

For measurement of LTE and Universal Mobile Terrestrial System (UMTS) systems, only one frequency is assigned per measurement object. However, for measurement of the Global System for Mobile communications (GSM) EDGE Radio Access Network (GERAN), a plurality of frequencies may be assigned to a single measurement object. In some embodiments up to 32 frequencies may be assigned to a single measurement object for GERAN networks.

The use of a plurality of frequencies for GERAN may be problematic in cases where the network requires specific information for a specific frequency. For example, if a GERAN network has a measurement object which measures 3 frequencies and finds a new cell, as reported through a Physical Cell Identity (PCI), the network may require the Cell Global Identity (CGI) for the new cell. However, if the network utilizes the measurement object, ambiguity may occur since the measurement object relates to 3 frequencies in the above example. If the PCI is reused between these various frequencies then the request for a CGI related to a PCI may be ambiguous at the UE.

In order to remove the ambiguity, the measurement object may be reconfigured. However, this causes significant overhead with regard to signaling, and complexity with regard to both the network and the UE. Further, the reconfiguring of a measurement object may cause the discarding of certain information required by the UE with regard to the measurement object, such as a list of cells which have triggered a certain measurement report, which may lead to degraded system performance.

BRIEF DESCRIPTION OF THE DRAWINGS

The present disclosure will be better understood with reference to the drawings, in which.

DETAILED DESCRIPTION

Figure 1:
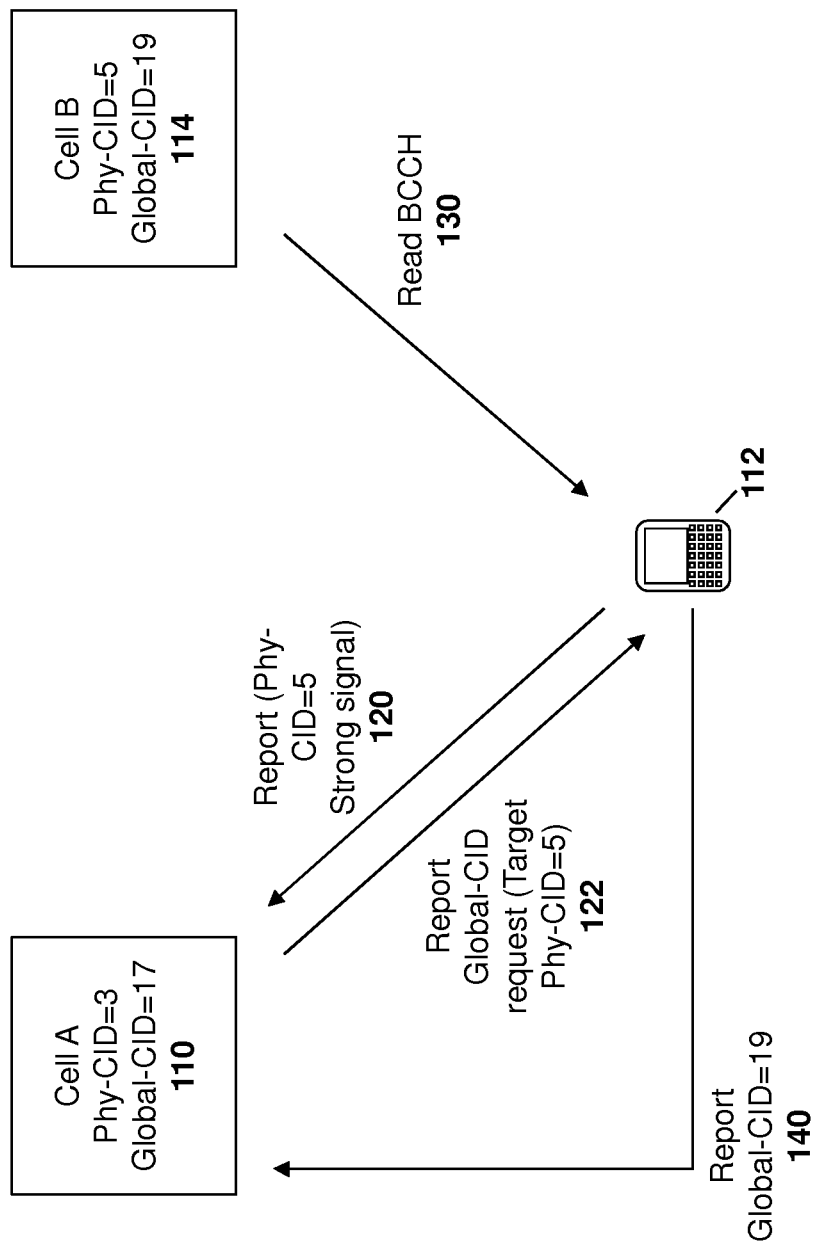
FIG. 1 is a block diagram showing signaling between a user equipment and two network entities.

The present disclosure provides a method at a user equipment comprising: receiving, at the user equipment, a measurement object from a network element for modifying an existing measurement object at the user equipment; and maintaining at least one of a measurement reporting entity, associated timers and any associated information if the received measurement object is only modified to configure cell global identifier reporting.

The present disclosure provides a method at a user equipment comprising: receiving, at the user equipment, a measurement object from a network element for modifying an existing measurement object at the user equipment; and maintaining at least one of a measurement reporting entry, associated timers and any associated information if the received measurement object is only modified to configure cell global identifier reporting.

The present disclosure further provides a user equipment comprising: a processor; and a communications subsystem, wherein the user equipment is configured to: receive a measurement object from a network element for modifying an existing measurement object at the user equipment; and maintain at least one of a measurement reporting entry, associated timers and any associated information if the received measurement object is only modified to configure cell global identifier reporting.

The present disclosure further provides a network element adapted to configure a measurement object at a user equipment with a plurality of frequencies, the network element comprising: a processor; and a communications subsystem, wherein the network element is configured to: reconfigure the measurement object to indicate a cell global identifier is to be reported on a specific frequency.

The present disclosure further provides a method at a network element communicating with a user equipment comprising: configuring, from the network element, a first measurement object for a first frequency at the user equipment; and configuring, from the network element, a second measurement object for the first frequency at the user equipment, the second measurement object being only for the reporting of a cell global identity.

The present disclosure further provides a network element communicating with a user equipment, the network element comprising: a processor; and a communications subsystem, wherein the processor and communications subsystem cooperate to: configure a first measurement object for a first frequency at the user equipment; and configure from the network element, a second measurement object for the first frequency at the user equipment, the second measurement object being only for the reporting of a cell global identity.

While the present disclosure is described below with regard to a Long Term Evolution (LTE) architecture, the methods and systems described could be equally applicable to other networks in which measurement objects are restricted such that only one frequency may be associated with a single measurement object. The present disclosure is therefore not limited to LTE networks.

An E-UTRAN network provides a model for reporting measurement information from a UE in accordance with a measurement configuration provided by the E-UTRAN. A measurement configuration may include various parameters. Five such parameters are measurement objects; reporting configurations; measurement identities; quantity configurations; and measurement gaps.

The UE maintains a single measurement object list, a single reporting configuration list, and a single measurement identities list. Any measurement object can be linked to any reporting configuration of the same Radio Access Technology (RAT) type through a measurement identity.

With regard to measurement objects, these are the objects on which the UE performs measurements. For intra-frequency and an inter-frequency measurement, a measurement object is a single E-UTRA carrier frequency. Associated with this carrier frequency, the E-UTRAN can configure a list of cell or frequency specific offsets and a list of 'blacklisted' cells. Blacklisted cells are not considered in event evaluation or measurement reporting.

For inter-RAT UTRA measurements a measurement object is a single UTRA carrier frequency. Associated with this carrier frequency, the E-UTRAN can configure set of cells For inter-RAT GERAN measurements a measurement object is a set of GERAN carrier frequencies.

For inter-RAT Code Divisional Multiple Access 2000 (CDMA2000) measurements, a measurement object is a set of cells on a single carrier frequency.

As seen from above, for LTE, UMTS and CDMA2000, the measurement object relates to a single frequency. However, for GERAN, the measurement object relates to potentially a plurality of carrier frequencies.

A second parameter that may be configured with the measurement configuration includes reporting configurations. Reporting configurations are provided to a UE in a list, and each has a reporting criterion in a reporting format. A reporting criterion is a criterion that triggers the UE to send a measurement report. This can be either periodical or a single event description. The reporting format provides the quantities that the UE includes in the measurement report and associated information such as the number of cells to report, for example.

A third parameter that may be within the measurement configuration includes measurement identities. Measurement identities are provided in a list and each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. Thus, for example, a measurement identity may link a measurement object with a reporting configuration, for example, for Radio Resource Management (RRM) reporting for handover or other purposes and another measurement identity may link the same measurement object with a second reporting configuration that may be provided for automatic neighbor relation functions as described below.

A fourth parameter for a measurement configuration may be quantity configurations. One quantity configuration is configured per RAT type. The quantity configuration defines the measurement quantities and associated filtering used for all event evaluation and related reporting of that measurement type. One filter can be configured per measurement quantity.

A fifth parameter for measurement configuration includes a measurement gap. Measurement gaps are the periods that the UE may use to perform measurements. In other words, the measurement gaps occur when no uplink or downlink transmissions are scheduled.

Such measurement configurations may be signaled to the UE through dedicated signaling such as through an RRC_ConnectionReconfigurationMessage and require the UE to report based on the given configuration.

While the measurement reports might be used for handover purposes, a second purpose is Automatic Neighbor Relation functions. Historically, Neighbor Relations were provided manually at each cell. However, this was burdensome to network carriers and thus an Automatic Neighbor Relation (ANR) function was created to relieve the operator from the burden of manually managing these Neighbor Relations. The $3^{rd}$ Generation Partnership Project, Technical Specification 36.300, "Evolved Universal Terrestrial Radio Access (E-UTRA) and Evolved Universal Terrestrial Radio Access Network (E-UTRAN) Overall description Stage 2", version 11.2.0, Jul. 2, 2012, the contents of which are incorporated herein by reference, defines a high level overview of the ANR functionality. ANR functionality is applicable to intra-frequency, inter-frequency and inter-RAT measurements. Reference is now made to FIG. 1 which explains the inter-frequency or inter-RAT cases.

As seen in FIG. 1, a first cell 110 communicates with a UE 112. When the UE 112 is in a connected mode with cell 110, the eNB of cell 110 can instruct the UE to perform measurements and detect cells on other RATs or frequencies. The eNB may use different policies for instructing the UE to do the measurement and when to report the measurements to the eNB. To facilitate such reporting, the eNB may need to schedule appropriate idle periods to allow the UE to scan all cells in the target RATs or frequencies. In the example of FIG. 1, the UE 112 detects a second cell 114, including the physical cell identifier (PCI) and the signal strength of second cell 114.

UE 112 reports the frequency, PCI and signal strength for the detected cell, as shown by arrow 120 in FIG. 1, to the first cell 110. The PCI is defined by the carrier frequency and the Primary Scrambling Code (PSC) in the case of a UTRAN Frequency Division Duplex (FDD) cell, by the carrier frequency in the cell parameter ID in the case of a UTRAN Time Division Duplex (TDD) cell, by the band indicator plus the Base Station Identity Code (BSIC) and the Automatic Radio Frequency Carrier Number (ARFCN) in the case of a GERAN cell and by the Pseudorandom Noise (PN) offset of a CDMA2000 cell.

When the eNB receives the UE report containing PCI(s) of a cell or cells, the eNB may instruct the UE, using the newly discovered PCI as a parameter, to read the CGI and the Routing Area Code (RAC) of the detected neighbor cell in case of a GERAN detected cell, the CGI, Location Area Code (LAC), RAC and all available Public Land Mobile Network (PLMN) identities in the case of a UTRAN detected cell, and the CGI in the case of a CDMA2000 detected cell. For an inter-frequency case, the eNB may instruct the UE, using the newly discovered PCI as a parameter to read the E-UTRAN Cell Global Identifier (ECGI), Tracking Area Code (TAC), and all available PLMN Identifiers of the inter-frequency detected cell. The request is shown in FIG. 1 by arrow 122, in which cell 110 requests the CGI for the target physical cell ID=5, which matches the cell 114.

Based on the request at arrow 122, UE 112 reads the broadcast control channel (BCCH) of cell 114, as shown by arrow 130. The UE may ignore transmissions from the serving cell while finding the requested information transmitted in the broadcast channel of the detected inter-system/inter-frequency neighbor cell. In order to do this, the eNB may need to schedule appropriate idle periods to allow the UE to read the requested information from the broadcast channel of the detected inter-RAT/inter-frequency neighbor cell.

After the UE has read the requested information in the new cell, it reports the detected CGI and RAC (in case of GERAN detected cells) or the CGI, LAC, RAC and PLMN-ID(s) (in the case of UTRAN detected cell) or the CGI (in the case of a CDMA2000 detected cell) to the serving cell Evolved Node B (eNB). In the inter-frequency case, the UE reports the ECGI, the TAC and all PLMN-ID(s) that have been detected. If the detecting cell is a Closed Subscriber Group (CSG) or hybrid cell, the UE may also report the CSG ID to the serving cell eNB. The above report is shown in FIG. 1 by arrow 140.

Cell 110 then updates its inter-RAT/inter-frequency Neighbor Relation Table.

The measurement object for a GERAN cell is referred to as a MeasObjectGERAN information element. Reference is now made to Table 1, in which the MeasObjectGERAN information element specifies information applicable for inter-RAT GERAN neighboring frequencies.

TABLE 1

MeasObjectGERAN information element

```
-- ASN1START
MeasObjectGERAN ::=         SEQUENCE {
   carrierFreqs              CarrierFreqsGERAN,
   offsetFreq                Q-OffsetRangeInterRAT   DEFAULT 0,
   ncc-Permitted             BIT STRING(SIZE (8))    DEFAULT
'11111111'B,
   cellForWhichToReportCGI   PhysCellIdGERAN
                             OPTIONAL, -- Need ON
   ...
}
-- ASN1STOP
```

From Table 1 above, the GERAN measurement object indicates a set of frequencies, CarrierFreqsGERAN in which the UE detects and measures a GERAN cell. A set of GERAN frequencies can be defined in a number of ways. For example, a startingARFCN and followingARFCNs may be provided in an explicit list. Alternatively, equally spaced frequencies or bitmap may also be provided.

The physical cell identity of the target cell of CGI reporting measurement is indicated by the PhysCellIdG-ERAN. In configuration of a measurement object, the E-UTRAN only configures a single measurement object for a given frequency. In other words, it is not possible to configure two or more measurement objects for the same frequencies with different associated parameters.

The Information Element CarrierFreqListGERAN defined in 3GPP TS 36.331 "Evolved Universal Terrestrial Radio Access (E-UTRA) Radio Resource Control (RRC)", v. 11.0.0, Jul. 3, 2012 is used to provide one or more GERAN ARFCN values, as defined in the 3GPP TS 44.005, "Data Link (DL) Layer, General Aspects", v. 8.1.0, Mar. 16, 2009, the contents of which are incorporated herein by reference. The CarrierFreqListGERAN represents a list of GERAN BCCH carrier frequencies, and are provided below with regard to Table 2.

TABLE 2

CarrierFreqsGERAN IE

```
-- ASN1START
CarrierFreqsGERAN ::=       SEQUENCE {
   startingARFCN              ARFCN-ValueGERAN,
   bandIndicator              BandIndicatorGERAN,
   followingARFCNs            CHOICE {
      explicitListOfARFCNs       ExplicitListOfARFCNs,
      equallySpacedARFCNs        SEQUENCE {
         arfcn-Spacing              INTEGER (1..8),
         numberOfFollowingARFCNs    INTEGER (0..31)
      },
      variableBitMapOfARFCNs     OCTET STRING (SIZE (1..16))
   }
}
ExplicitListOfARFCNs ::=    SEQUENCE (SIZE (0..31)) OF ARFCN-ValueGERAN
-- ASN1STOP
```

CarrierFreqsGERAN field descriptions arfcn-Spacing
Space, d, between a set of equally spaced ARFCN values.
bandIndicator
Indicates how to interpret the ARFCN of the BCCH carrier.
explicitListOfARFCNs
The remaining ARFCN values in the set are explicitly listed one by one.
followingARFCNs TABLE 2-continued CarrierFreqsGERAN IE Field containing a representation of the remaining ARFCN values in the set.
numberOfFollowingARFCNs
The number, n, of the remaining equally spaced ARFCN values in the set. The complete
set of (n + 1) ARFCN values is defined as: {s, ((s + d) mod 1024), ((s + 2 * d) mod 1024) ...
((s + n * d) mod 1024)}.
startingARFCN
The first ARFCN value, s, in the set.
variableBitMapOfARFCNs
Bitmap field representing the remaining ARFCN values in the set. The leading bit of the
first octet in the bitmap corresponds to the ARFCN = ((s + 1) mod 1024), the next bit to
the ARFCN = ((s + 2) mod 1024), and so on. If the bitmap consist of N octets, the trailing
bit of octet N corresponds to ARFCN = ((s + 8 * N) mod 1024). The complete set of ARFCN
values consists of ARFCN = s and the ARFCN values, where the corresponding bit in the
bitmap is set to "1".

As seen in Table 2, the frequencies may be explicit or may be provided by equally spaced frequencies or a variable bit map of frequencies.

From the description above, at least three issues are present. These are that the setting up of measurement objects specifically for the purposes of CGI reporting may lead to unclear or ambiguous instructions to a UE. Further, in order to overcome the ambiguities, problems may arise through the management of measurement objects for reporting of the CGI. Finally, the reconfiguring of a measurement object may lead to disruption of ongoing measurements and the discarding of certain information. Each of the above issues is discussed below.

Unclean/Ambiguous GERAN Cells when Reporting CGI

If a GERAN measurement object indicates multiple GSM frequencies and a PCI in the cellForWhichToReportCGI, the network's intentions may be unclear or ambiguous.

The ambiguity may be shown by way of an example. If the GERAN measurement object includes three frequencies for the UE to scan, namely gf1, gf2 and gf3, the UE may then scan these frequencies for new cells. If the UE detects a new cell on gf2, the UE can provide a measurement result of a GERAN cell in frequency gf2 using a PCI. The measurement result contains the PCI, which in the case of a GERAN cell is the BSIC, the ARFCN of gf2, a band indicator and a Received Signal Strength Indicator (RSSI).

If the network wants to know the CGI of the reported cell, the network must currently modify the measurement object to provide the "cellForWhich ToReportCGI" with the PCI for which the network wants the CGI. However, since the measurement object is scanning three frequencies and since the PCI may be reused between frequencies, if two frequencies contain the same PCI, it may be unclear which cell the network wants the CGI for.

Utilizing the example above, if both gf1 and gf2 contained a PCI value of "5", then the UE would be unsure whether the E-UTRAN wanted the CGI for the cell on gf1 or the cell on gf2.

The ambiguities are undesirable since they may lead the network to not obtain the desired information.

Further, according to Section 5.5.4.1 of the 3GPP TS 36.331 "Evolved Universal Terrestrial Radio Access (E-UTRA) Radio Resource Control (RRC)", v. 11.0.0, Jul. 3, 2012, the UE needs to consider any neighboring cell detected on the associated frequency or set of frequencies which has a physical cell identity matching the value of the cellForWhichToReportCGI. Also, it is undesirable to have multiple CGIs reported since this will cause significant processing overhead at the user equipment. The contents of 3GPP TS 36.331 are incorporated herein by reference.

Section 5.5.4 of the 3GPP TS 36.331 is reproduced below in Table 3.

TABLE 3

3GPP TS 36.331, Section 5.5.4 Measurement report triggering
5.5.4.1 General

The UE shall:
  1> for each measId included in the measIdList within VarMeasConfig:
    2> if the corresponding reportConfig includes a purpose set to reportStrongestCellsForSON:
      3> consider any neighbouring cell detected on the associated frequency to be applicable;
    2> else if the corresponding reportConfig includes a purpose set to reportCGI:
      3> consider any neighbouring cell detected on the associated frequency/set of frequencies (GERAN) which has a physical cell identity matching the value of the cellForWhichToReportCGI included in the corresponding measObject within the VarMeasConfig to be applicable;

As seen above, ambiguity for a GERAN cell occurs when reporting the CGI if multiple frequencies are utilized.

Managing Measurement Objects

A second issue relates to the management of measurement objects. In order to remove the ambiguity discussed above, one option is to reconfigure the measurement object in order to provide for a CGI report for a specific frequency. According to the principle that configuring two or more measurement objects is not allowed for the same frequency with different associated parameters, the network needs to configure two GERAN measurement objects in order to continue on-going measurements and to read the CGI.

For example, utilizing the scenario above, if the three frequencies gf1, gf2 and gf3 are used in a measurement object, and the PCI is found for gf2, the network could modify the existing measurement object to read only gf1 and gf3 and therefore allow for the on-going measurements of gf1 and gf3. Further, a new measurement object could be added for the ongoing measurement for gf2 and also for reporting the CGI. The new measurement object on gf2 would be unambiguous since there is only one frequency for which the CGI needs to be reported.

Alternatively, the network may remove the existing measurement objects and add two measurement objects, one for continuing measurements for gf1 and gf3 and another for continuing the measurement of gf2 and reporting the CGI on gf2.

When the reporting of the CGI measurement is completed, the network may need to reconfigure the measurement objects to go back to the original configuration that measures all three frequencies.

The separating and integrating measurement objects provided above involves complicated operations and increases eNB complexity and increases the size or number of the RRC connection reconfiguration messages needed.

Reconfiguration Disruptions

In addition to the above, the reconfiguration, including modifying, deleting or creating of measurement objects for CGI reporting, may disrupt ongoing measurements (layer 3 filtering) or ongoing measurement reporting operations. In accordance with the 3GPP TS 36.331 specification, and in particular section 5.5.2.5, as provided in Table 4 below, the measurement reporting entry of the measurement identity associated with the modified measurement object will be removed, the periodical reporting timer or timer T321 will be stopped, and associated information for the measurement ID will be reset. As a consequence, the list of cells which triggered measurement reports or other important information to continue the on-going measurements and measurement reporting may be lost, which disrupts on-going measurements and measurement reporting. This problem is applicable not only to GERAN, but also UTRAN and E-UTRAN.

In order to overcome the above, various embodiments of the present disclosure provide for various solutions. These include the relaxation of the measurement object principle; an indication of ARFCN for CGI reading; measurement interruption avoidance; implicit indications of ARFCN for CGI reading; the use of a different object than a measurement object to report the cell for which to report the CGI; the use of a measurement configuration report to indicate the CGI cell or the selection of an ARFCN using to find rules at the UE. Each is discussed below.

Relaxation of the Measurement Object Principle

In accordance with one embodiment of the present disclosure, an exception to the current principle that the configuring of two or more measurement objects is not allowed for the same frequency with different associated parameters is provided. In one embodiment, at most two measurement objects can have the same frequency when CGI reporting is configured. Thus, for example the network is allowed to configure two measurement objects for a GERAN frequency.

Such configuration would not be considered an error by the UE and may have certain conditions in order to allow the UE to utilize the measurement objects. Such conditions may include, but are not limited to:

a. that exactly one of the measurement objects (referred to as the CGI measurement object hereafter) is linked via a measurement identity to a reporting configuration for the purpose of reporting the CGI;

b. that the CGI measurement object is not configured in any other measurement identity; and/or c. that the CGI measurement object associated with a reporting configuration having the purpose of reporting the CGI may contain only 1 frequency and cellForWhichToReportCGI;

d. more than one measurement object for a frequency is only allowed when there are two measurement objects for a frequency and one measurement object for the frequency has cellForWhich ToReportCGI and exactly

TABLE 4

3GPP TS 36.331, S. 5.5.2.5 Measurement object addition/modification

The UE shall:
1> for each measObjectId included in the received measObjectToAddModList:
   2> if an entry with the matching measObjectId exists in the measObjectList within the VarMeasConfig, for this entry:
      3> replace the entry with the value received for this measObject, except for the fields cellsToAddModList, blackCellsToAddModList, cellsToRemoveList, blackCellsToRemoveList and measSubframePatternConfig Neigh;
      <text omitted>
      3> for each measId associated with this measObjectId in the measIdList within the VarMeasConfig, if any:
         4> remove the measurement reporting entry for this measId from the VarMeasReportList, if included;
         4> stop the periodical reporting timer or timer T321, whichever one is running, and reset the associated information (e.g. timeToTrigger) for this measId;
   2> else:
      3> add a new entry for the received measObject to the measObjectList within VarMeasConfig;

As seen in Table 4, level (4>) paragraphs include the removing of the measurement reporting entry, the stopping of the periodical reporting timer or timer T321, and the resetting of associated information.

Based on the UE ambiguities, management of measurement objects, and reconfiguration disruptions, current measurement reporting for GERAN can be problematic. Reconfiguration disruptions also affect the UTRAN and E-UTRAN.

one GERAN frequency, and is not associated with any reportConfig except optionally one having reportCGI purpose.

The above conditions may be taken alone or in combination with each other.

Thus, the network can maintain existing measurement objects without change, and add a new measurement object for CGI reporting only, thereby avoiding possible measurement disruption and also providing for the CGI measurement in an unambiguous way. The relaxing of the measurement object principle therefore solves UE ambiguities, and since measurement object reconfiguration is not needed, there are no issues with managing measurement objects or reconfiguration disruptions.

In one embodiment, the second measurement object when configured allows the UE to ignore all information elements in the measurement object other than the carrierFreq(s) and the cellForWhichToReportCGI, as these are the only information elements needed to report the CGI. Not ignoring other parameters may also lead to ambiguity about which set of parameters (those from the first measurement object or those from the second) apply to the frequency.

Figure 2:
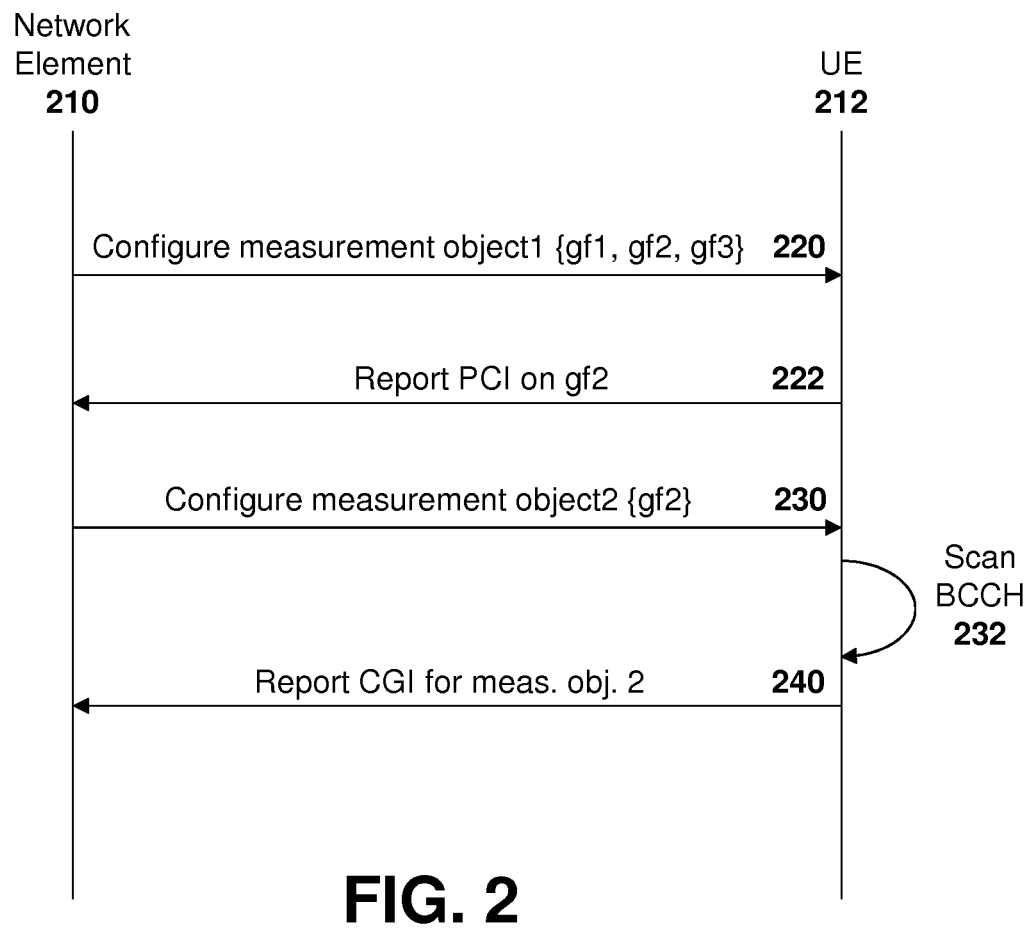
FIG. 2 is a signaling diagram showing the configuration of a second measurement object for reporting CGI.

Reference is now made to FIG. 2, which shows an example of communication between a network element 210 and a UE 212. In the embodiment of FIG. 2, the network element 210 configures the UE 212 to scan three GERAN frequencies, namely gf1, gf2 and gf3, for RRM reporting in a first measurement object, as seen at arrow 220. In one embodiment, the message of arrow 220 may be an RRCConnectionReconfiguration message.

As a result of receipt of the first measurement object, UE 212 detects and reports that it sees a cell on gf2 with a particular PCI. Such report is shown by arrow 222 in FIG. 2. In one embodiment, the report of arrow 222 may be a Measurement Report.

The network element 210 then decides that it wants the CGI for the reported PCI on gf2. In accordance with the present embodiment, network element 210 then sends a message, shown by arrow 230, adding a second measurement object in which a single frequency of gf2 is indicated. The cell for which to report the CGI is set to the PCI reported in the message at arrow 222. The message of arrow 230 may, in one embodiment be an RRCConnectionReconfiguration message. In addition to adding a second measurement object, the message (e.g. RRCConnectionReconfiguration) adds a new reporting configuration with purpose set to report CGI, and adds a new measurement identity which links the second measurement object with the new reporting configuration.

As a result of the configuration message at arrow 230, UE 212 then reads the BCCH of the cell having the PCI on gf2, shown by arrow 232, and sends a report, shown by arrow 240, back to network element 210 providing the CGI.

Network element 210 may then delete the second measurement object from UE 212.

Reference is now made to Tables 5A, 5B and 5C below. Table 5A shows an example of a modification to the 3GPP TS 36.331 specification, and in particular to the section 5.5.1 of the specification. The modification is shown in bold.

TABLE 5A

Amendment to 3GPP TS 36.331, section 5.5.1

E-UTRAN only configures a single measurement object for a given frequency, i.e. it is not possible to configure two or more measurement objects for the same frequency with different associated parameters, e.g. different offsets and/or blacklists. An exception to this rule is that two measurement objects for a GERAN frequency may be configured provided that exactly one of them includes a single GERAN frequency and cellForWhichToReportCGI, and the measurement object can be only linked via a measurement identity to a reporting configuration with purpose reportCGI, and provided that the measurement object is not configured in any other measurement identity. When a second measurement object is so configured, all the IEs in that measurement object other than carrierFreq(s) and cellForWhichToReportCGI shall be ignored. E-UTRAN may configure multiple instances of the same event e.g. by configuring two reporting configurations with different thresholds.

Alternatively, reference is made to Table 5B, which shows different phrasing for the specification changes.

TABLE 5B

Amendment to 3GPP TS 36.331, section 5.5.1

E-UTRAN only configures a single measurement object for a given frequency, i.e. it is not possible to configure two or more measurement objects for the same frequency with different associated parameters, e.g. different offsets and/or blacklists. An exception to this rule is that two measurement objects for a GERAN frequency may be configured. A second measurement object for a GERAN frequency may be configured for CGI reporting purpose. This second measurement object shall have cellForWhichToReportCGI and carrierFreqs IEs set with carrierFreqs including only one GERAN frequency. All other IEs in the second measurement object shall be ignored. E-UTRAN may configure multiple instances of the same event e.g. by configuring two reporting configurations with different thresholds.

In a further alternative, the above may be simplified in accordance with Table 5C below.

TABLE 5C

Amendment to 3GPP TS 36.331, section 5.5.1

E-UTRAN only configures a single measurement object for a given frequency, i.e. it is not possible to configure two or more measurement objects for the same frequency with different associated parameters, e.g. different offsets and/ or blacklists, except cellForWhichToReportCGI. E-UTRAN may configure multiple instances of the same event e.g. by configuring two reporting configurations with different thresholds.

As seen in Tables 5A, 5B and 5C, an exception is provided that two measurement objects for GERAN frequency may be configured, provided that exactly one of them includes a single GERAN frequency and cellForWhichToReportCGI and the measurement object is linked through a measurement identity to a reporting configuration having the purpose of reportCGI, and provided that the measurement object is not configured in any other measurement identity. In this case, all IEs except for the carrierFreqs and the cell for which to report CGI are ignored.

In order to signal that a UE is compliant with the above embodiment, various options are possible. In one embodiment, the associated neighbor relation feature has a Feature Group Indicator (FGI) bit. In particular, FGI bit 34 corresponds to GERAN ANR functionality and this bit may be toggled to indicate that the UE supports the multiple measurement objects for the same frequency. This may be done to prevent the network from requesting a UE that does not support the behavior to report the CGI.

Indication of GERAN ARFCN for CGI Reading

In alternative embodiment, an existing measObjectGERAN may be modified by adding a new information element. In particular, the information element may add a "carrierFreqForWhichToReportCGI". This information element is, however, merely an example and other information elements may be provided.

The addition of the information element which specifies the carrier frequency for which to report the CGI allows the target cell to be identified unambiguously. With the information element, the UE can perform ongoing measurements and handle CGI reporting utilizing a single measurement object, thus simplifying protocol operation.

Instead of specifying a frequency, an ARFCN index value may instead be specified. The index points to the ARFCN for reporting CGI. An example of the additional information element definition is provided below with regard to Table 6.

TABLE 6

| MeasObjectGERAN information element | | | |
|---|---|---|---|
| -- ASN1START | | | |
| MeasObjectGERAN ::= | SEQUENCE { | | |
| carrierFreqs | CarrierFreqsGERAN, | | |
| offsetFreq | Q-OffsetRangeInterRAT | DEFAULT 0, | |
| ncc-Permitted | BIT STRING(SIZE (8)) | DEFAULT '11111111'B, | |
| cellForWhichToReportCGI | PhysCellIdGERAN | OPTIONAL, -- Need ON | |
| ..., | | | |
| [[carrierFreqForWhichToreportCGI | ARFCN-ValueGERAN | OPTIONAL, -- Need ON ]] | |
| } | | | |
| -- ASN1STOP | | | |

| MeasObjectGERAN field descriptions |
|---|
| ncc-Permitted |
| Field encoded as a bit map, where bit N is set to "0" if a BCCH carrier with NCC = N − 1 is not permitted for monitoring and set to "1" if a BCCH carrier with NCC = N − 1 is permitted for monitoring; N = 1 to 8; bit 1 of the bitmap is the leading bit of the bit string. |
| carrierFreqForWhichToreportCGI |
| Identifies the ARFCN for which cellForWhichToReportCGI is reported if more than one ARFCN is configured. |

As seen above, the carrierFreqForWhichToreportCGI identifies the frequency to report if more than one carrier frequency is configured.

Figure 3:
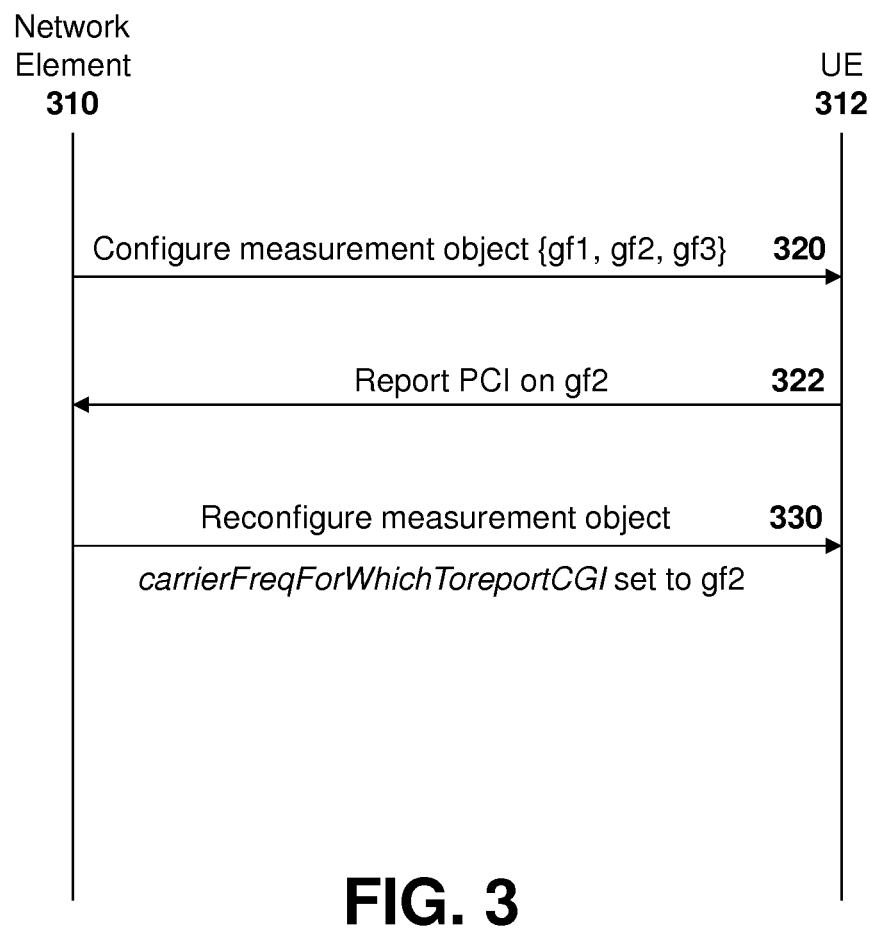
FIG. 3 is a signaling diagram showing the reconfiguration of a measurement object with a new information element to report CGI.

Reference is now made to FIG. 3, which shows one example of a network element 310 communicating with a UE 312.

As seen at arrow 320, the network element configures a measurement object for three frequencies, namely gf1, gf2 and gf3.

The UE 312 detects a cell on gf2, and provides a report providing a PCI value of the discovered cell, as shown by arrow 322.

After receiving the message at arrow 322, the network element 310 decides it would like to receive the CGI value for the new cell, and as a result the network element 310 modifies the measurement object that was previously configured at arrow 320 with the carrierFreqForWhichToreportCGI information element to include the ARFCN associated with gf2, adds a new reporting configuration in which purpose is set to report CGI, and adds a new measurement identity which links the modified measurement object with the new reporting configuration. This is shown by arrow 330 in the example of FIG. 3.

The reconfiguration at arrow 330 may further comprise adding the PCI value in the cellForWhichToReportCGI in order to indicate that a CGI report is required.

Implicit Indication of AFRCN for CGI Reading

In a further embodiment, implicit indication of the frequency for CGI reporting may be performed utilizing current GERAN measurement objects. This may be done, for example, using a startingARFCN and explicitListOfARFCN. In the present embodiment, the first ARFCN within the explicitListOfARFCN may implicitly indicate the frequency for CGI reporting. Alternatively, a different ARFCN in the measurement object could be implicitly identified such as the last one, or the startingARFCN may implicitly indicate the frequency for CGI reporting. Note that when the measurement object contains a single GERAN frequency and CGI reporting is configured, then the single frequency is used, and the rule selecting the first frequency in the ExplicitList is not used.

When the network reconfigures the GERAN measurement object for CGI reporting, the network may change the startingARFCN and explicitListOfARFCN accordingly. While the ARFCN may normally be specified explicitly, through a bitmap, or using equally spaced frequencies, the present embodiment limits the specification of the ARFCN to an explicit indication.

Reference is now made to Table 7, which shows a carrierFreqsGERAN information element.

TABLE 7

CarrierFreqsGERAN information element

```
-- ASN1START
CarrierFreqsGERAN ::=        SEQUENCE {
    startingARFCN            ARFCN-ValueGERAN,
    bandIndicator            BandIndicatorGERAN,
    followingARFCNs          CHOICE {
        explicitListOfARFCNs     ExplicitListOfARFCNs,
        equallySpacedARFCNs      SEQUENCE {
            arfcn-Spacing            INTEGER (1..8),
            numberOfFollowingARFCNs  INTEGER (0..31)
        },
        variableBitMapOfARFCNs   OCTET STRING (SIZE
                                 (1..16))
    }
}
ExplicitListOfARFCNs ::=     SEQUENCE (SIZE (0..31)) OF
ARFCN-ValueGERAN
-- ASN1STOP
```

CarrierFreqsGERAN field descriptions arfcn-Spacing
Space, d, between a set of equally spaced ARFCN values.
bandIndicator
Indicates how to interpret the ARFCN of the BCCH carrier.
explicitListOfARFCNs
The remaining ARFCN values in the set are explicitly listed one by one.
If CGI is to be reported the first ARFCN is the frequency for which CGI is to be reported if multiple frequencies are configured.
followingARFCNs
Field containing a representation of the remaining ARFCN values in the set.
numberOfFollowingARFCNs
The number, n, of the remaining equally spaced ARFCN values in the set. The complete set of (n + 1) ARFCN values is defined as: {s, ((s + d) mod 1024), ((s + 2 * d) mod 1024) ... ((s + n * d) mod 1024)}.
startingARFCN
The first ARFCN value, s, in the set.
variableBitMapOfARFCNs
Bitmap field representing the remaining ARFCN values in the set. The leading bit of the first octet in the bitmap corresponds to the ARFCN = ((s + 1) mod 1024), the next bit to the ARFCN = ((s + 2) mod 1024), and so on. If the bitmap consist of N octets, the trailing bit of octet TABLE 7-continued CarrierFreqsGERAN information element N corresponds to ARFCN = ((s + 8 * N) mod 1024). The complete set of ARFCN values consists of ARFCN = s and the ARFCN values, where the corresponding bit in the bitmap is set to "1".

As seen in Table 7 above, the explicitListOfARFCNs is amended to indicate that the first ARFCN is the frequency for which the CGI is to be reported if multiple frequencies are configured. Modification to existing specifications are noted in bold.

Figure 4:
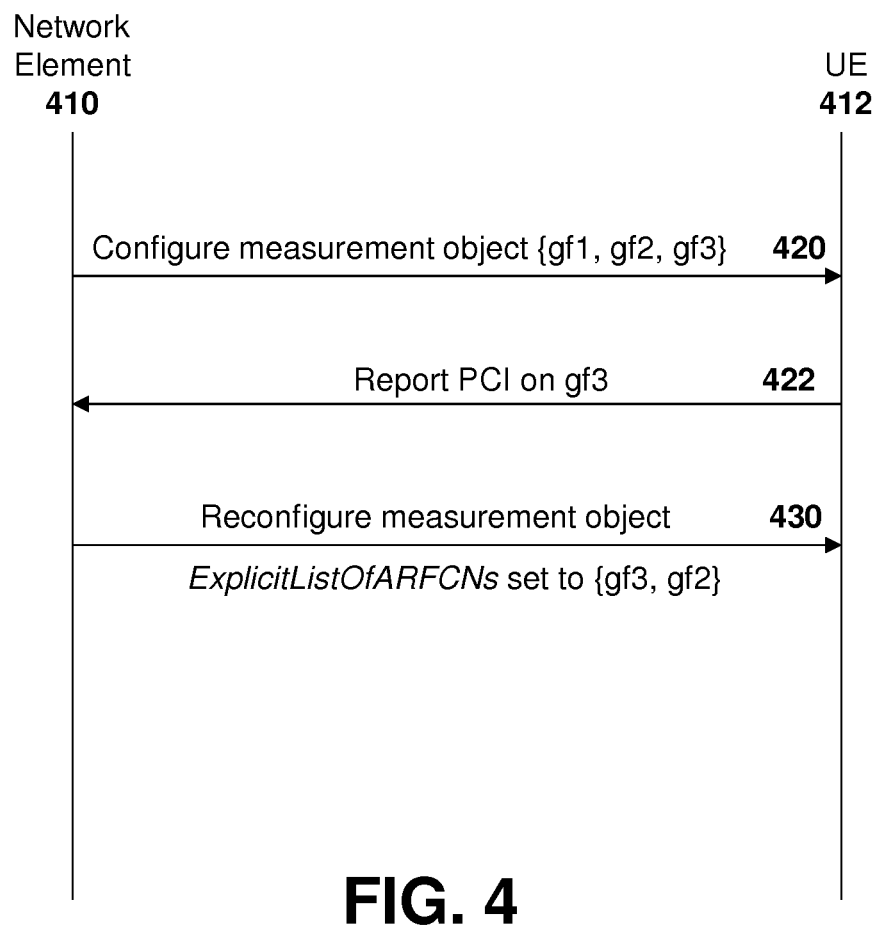
FIG. 4 is a signaling diagram showing the reconfiguration of a measurement object in which the ARFCNs are ordered to provide implicit signaling.

Reference is now made to FIG. 4, which shows an example of communications between a network element 410 and a UE 412.

The network element 410 sends a configuration message, shown by arrow 420, to UE 412, which configures the measurement object. As with the examples above, in the example of FIG. 4 three frequencies are provided for the measurement object, namely gf1, gf2 and gf3.

UE 412 subsequently discovers a cell on gf3 and provides a report with the PCI for the gf3, as shown by arrow 422.

Network element 410 then reconfigures the measurement object, shown by arrow 430. In the reconfiguration, the PCI is added in the cellForWhichToReportCGI, and the ExplicitListOfARFCNs is ordered to reflect the ARFCNs for gf3 and gf2, in that order (in this case, gf1 is sent in a startingARFCN). With the reordered ExplicitListOfARFCNs, the UE can then utilize the implicit indication of the first ARFCN to provide the CGI frequency. The reconfiguration also adds a new reporting configuration in which purpose is set to report CGI, and adds a new measurement identity which links the modified measurement object with the new reporting configuration.

The embodiment of FIG. 4 therefore solves the ambiguity issues as well as the overhead issues required for significant reconfiguration of measurement objects as described above.

Selection of ARFCN by the UE

In a further alternative embodiment, if the GERAN measurement object contains two or more ARFCNs, the UE may have a default algorithm with which to select the ARFCN for reporting the CGI. For example, in one embodiment, the UE may select an ARFCN of a cell which has a physical cell identity equal to the cellForWhichToReportCGI and was most recently included in a transmitted measurement report of this RRC connection or a measurement report associated with a GERAN measurement object.

Specifically, the UE may identify ARFCNs of cells which have a physical cell ID equal to the cell configured in the cellForWhichToReportCGI. If only one such ARFCN is identified, this ARFCN is selected for the frequency reporting the CGI.

If two or more ARFCNs are identified, the ARFCN may be selected based on the cell for which the PCI was most recently included in a transmitted measurement report of this RRC connection or a measurement report associated with a GERAN measurement object. Alternatively, all of the ARFCNs for cells that have physical ID equal to the cellForWhichToReportCGI if no such measurement reports have been sent may be identified.

If two or more ARFCNs still remain after applying the above, then the ARFCN of the strongest cell is chosen from those identified above. The UE can then choose which ARFCN to select among any that are still tied due to cells with equal strength.

The UE may not need to acquire a CGI if there is no cell with a BSIC matching the cell for which to report CGI.

The above is illustrated with reference to FIG. 5, which shows an example process at a UE.

Figure 5:
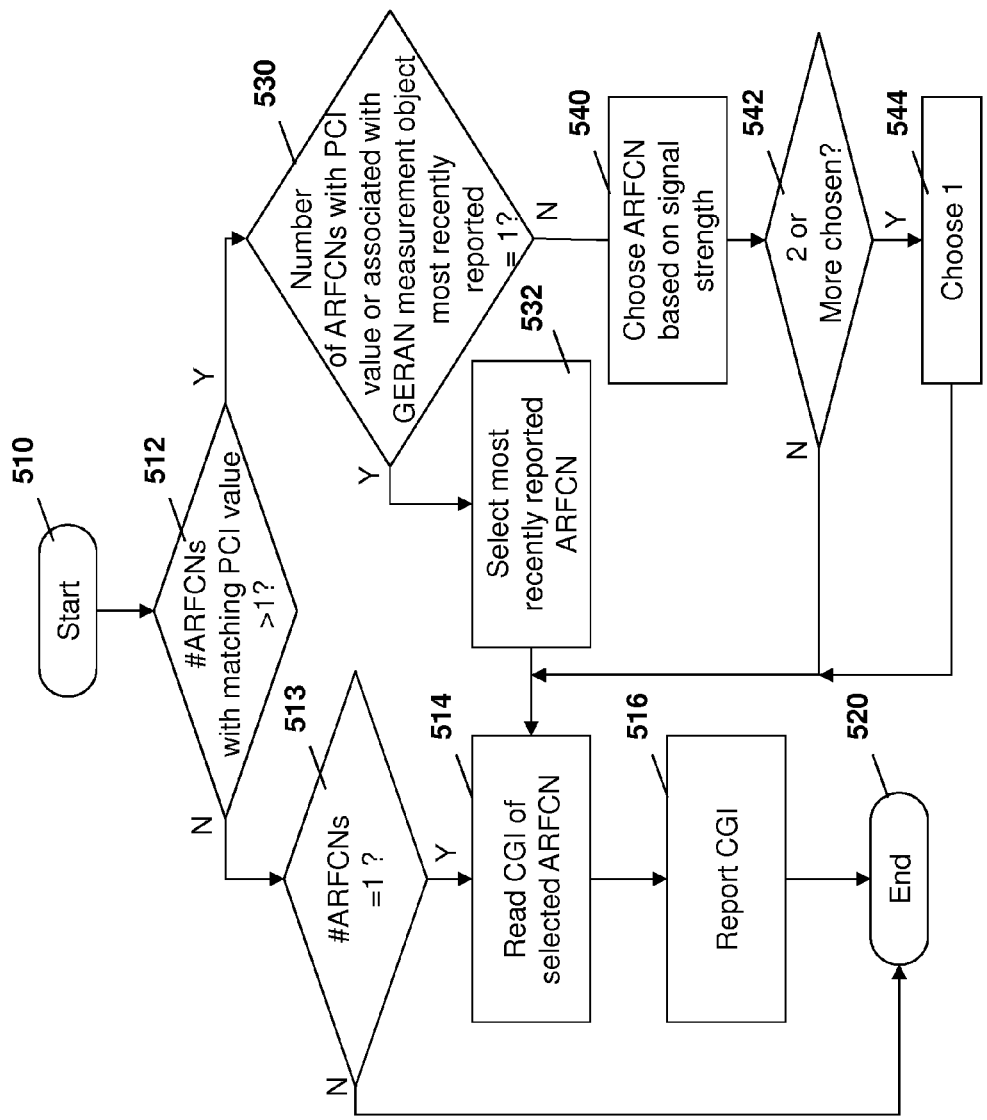
FIG. 5 is a process diagram showing a process at a UE for selecting an ARFCN for which to report the CGI.

The process of FIG. 5 starts at block 510 and proceeds to block 512 in which a UE checks whether a cellForWhichToReportCGI contains a PCI and whether the number of ARFCNs within the monitored frequencies (in the measurement object) with this PCI is greater than one. If not, the process proceeds to block 513 in which a check is made to ensure at least one ARFCN exists. If not, the process proceeds to block 520 and ends. Otherwise, the process proceeds to block 514 in which the CGI of the selected ARFCN is read and the process then proceeds to block 516 in which the CGI is reported to the network element. From block 516 the process proceeds to block 520 and ends.

If, conversely, the check at block 512 determines that there is more than one ARFCN within the monitored frequencies with a PCI identified in the cellForWhichToReportCGI, the process proceeds to block 530 in which a check is made to identify ARFCNs (from those in measurement object) of cells which have a physical cell ID equal to the cell configured in the cellForWhichToReportCGI that have been most recently reported in this RRC Connection. If there is more than one such ARFCN then the check at block 530 is false. From block 530 if there is only one ARFCN, then the process proceeds to block 532 in which the most recently reported ARFCN is selected and the process then proceeds to block 514 to detect the CGI.

Conversely, from block 530 if there is more than one such ARFCN then the process proceeds to block 540 in which an ARFCN is chosen based on the signal strength, selecting the strongest ARFCN, i.e. the one with the largest RSSI measurement.

The process then proceeds to block 542 in which a check is made to determine whether two or more ARFCNs are still chosen. This could occur, for example, if a plurality of frequencies associated with an ARFCN have the same signal strength. If yes, the process proceeds from block 542 to block 544 in which one of the ARFCNs is chosen, e.g. randomly or first listed ARFCN, or lowest ARFCN, etc.

From block 544, or from block 542 if the signal strength chooses only one ARFCN, the process proceeds to block 514 in which the CGI of the selected ARFCN is detected and the process then proceeds to block 516 in which the CGI is reported.

The behavior may be implemented using the measObjectGERAN information element, as defined by 3GPP TS 36.331, as shown in Table 8 below.

TABLE 8

MeasObjectGERAN information element

-- ASN1START
MeasObjectGERAN ::=         SEQUENCE {
    carrierFreqs            CarrierFreqsGERAN,
    offsetFreq              Q-
OffsetRangeInterRAT    DEFAULT 0,
    ncc-Permitted           BIT STRING(SIZE (8))
      DEFAULT '11111111'B,
    cellForWhichToReportCGI PhysCellIdGERAN
                OPTIONAL,    -- Need ON
    ...
}
-- ASN1STOP MeasObjectGERAN field descriptions ncc-Permitted
Field encoded as a bit map, where bit N is set to "0" if a BCCH carrier with NCC = N − 1 is not permitted for monitoring and set to "1" if a BCCH carrier with NCC = N − 1 is permitted for monitoring;

TABLE 8-continued

MeasObjectGERAN information element

N = 1 to 8; bit 1 of the bitmap is the leading bit of the bit string.
cellForWhichToReportCGI
Indicates the physical cell Identity of the cell whose CGI to be reported. If carrierFreqs contains two or more ARFCNs, the UE selects the ARFCN of a cell which has the physical cell identity equal to cellForWhichToReportCGI. If there are two or more such ARFCNs, the UE selects an ARFCN of a cell which has the physical cell identity equal to cellForWhichToReportCGI and was most recently included in a transmitted measurement report of this RRC connection or a transmitted measurement report associated with the GERAN measurement object. If there are still two or more such ARFCNs select an ARFCN of the strongest cell.

The cellForWhichToReportCGI is modified to indicate that the physical cell identity of the cell for which the CGI is to be reported is chosen based on the description in Table 8. If there are two or more frequencies configured in GERAN measurement objects, the following steps of selection criteria may be performed. 1) identify a ARFCN of a cell which has the indicated PCI. If a single ARFCN is identified, select the ARFCN. 2) If two or more such ARFCNs are identified, identify an ARFCN of a cell which meets the above condition and which was most recently included in a transmitted measurement report of this RRC connection or in a transmitted measurement report associated with the GERAN measurement object. If a single ARFCN is identified, select the ARFCN. 3) If two or more such ARFCNs are identified, identify a ARFCN of a cell which meets the above two conditions and which is the strongest cell in the measurement report or is the strongest cell currently. If there are multiple cells with the same strength, select any of them.

Based on the above, once the network element modifies the measurement object to indicate a PCI within the cellForWhichToReportCGI, the UE can thus perform its own conflict resolution to determine the appropriate cell. Further, the network may be aware of the contention based rules and thus may know, without ambiguity, which frequency the UE will report.

Measurement Interruption Avoidance

In all of the embodiments described above with reference to FIGS. 3, 4 and 5, the measurement object is modified. Namely, in the embodiment associated with FIG. 3, an information element to specify the frequency is provided. In the embodiment associated with FIG. 4, the explicit list of ARFCNs is sorted to provide an implicit indication of the frequency for which to find the CGI. In the embodiment of FIGS. 3, 4 and 5, the PCI value is set in the cellForWhichToReportCGI information element. Thus, based on the modification to the measurement object, the layer 3 filtering or measurement reporting may be interrupted based on the 3GPP TS 36.331 specification, and in particular section 5.5.2.5.

In order to avoid this, the embodiments of any of the above may be modified to add an exception to avoid interruption.

Thus, when requesting CGI reporting, the network may modify an existing measurement object. However, on the UE side, when the modification of a measurement object is set in the cellForWhichToReportCGI, and any of the other modifications with regard to FIG. 3, 4 or 5 are made, the UE may maintain the measurement reporting entry, continue the periodical reporting timer or timer T321, if running, and not reset the associated information.

TABLE 9

Section 5.5.2.5 Measurement object addition/modification
5.5.2.5 Measurement object addition/modification The UE shall:
1> for each measObjectId included in the received measObjectToAddModList:
   2> if an entry with the matching measObjectId exists in the measObjectList within the VarMeasConfig, for this entry:
      3> replace the entry with the value received for this measObject, except for the fields cellsToAddModList, blackCellsToAddModList, cellsToRemoveList, blackCellsToRemoveList and measSubframePatternConfigNeigh;
      <text omitted>
      3> if this measObject is not modified to only configure cellForWhichToReportCGI:
         4> for each measId associated with this measObjectId in the measIdList within the VarMeasConfig, if any:
            5> remove the measurement reporting entry for this measId from the VarMeasReportList, if included;
            5> stop the periodical reporting timer or timer T321, whichever one is running, and reset the associated information (e.g. timeToTrigger) for this measId;
   2> else:
      3> add a new entry for the received measObject to the measObjectList within VarMeasConfig;

As seen in Table 9 above, text may be added to the 3GPP TS 36.331 specification, and in particular to section 5.5.2.5, which provides the precondition that the measurement object is not modified to only configure the cell for which to report CGI. Thus, based on the amended text, as shown in bold, if the modification of the measurement object is only for the cellForWhichToReportCGI, the UE skips the removal of the measurement reporting entry and the stopping of the timers. This applies to the solution in FIG. 5. For the solutions of FIGS. 3 and 4, additional modifications to the measurement object may be allowed without executing the remove and reset behavior. These additional modifications could be to allow an ARFCN to be added to the IE carrierFreqForWhichToreportCGI or the StartingARFCN and ExplicitList to be provided to re-order (but not change) the frequencies in the measurement object.

Figure 6:
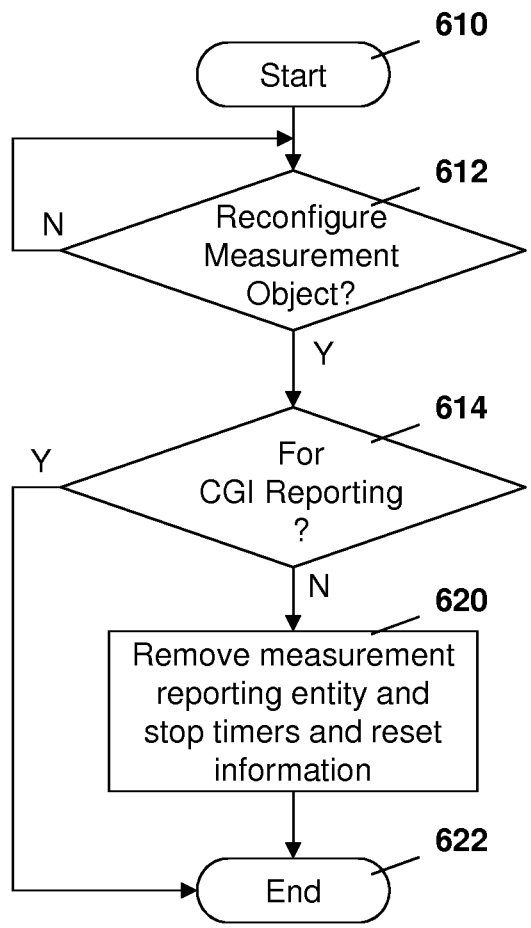
FIG. 6 is a process diagram showing a process at a UE for avoiding reconfiguration clearing of information.

Reference is now made to FIG. 6, which shows an example process at a user equipment for avoiding reconfiguration issues for CGI reporting. The process of FIG. 6 starts at block 610 and proceeds to block 612 in which a check is made to determine whether or not a reconfigured measurement object has been received at the UE. If no, the process proceeds back to block 612 until a reconfigured measurement object is received.

Once a reconfigured measurement object is received, the process proceeds to block 614 in which a check is made to determine Whether the reconfiguration of the measurement object is only for CGI reporting. If no, the process proceeds to block 620 in which the measurement reporting entry for the measurement ID is removed, the periodical reporting timer or timer T321 are stopped and the associated information is reset.

The process then proceeds from block 620 to block 622 and ends.

From block 614, if the reconfigured measurement object is only modified for CGI reporting, the process proceeds directly to block 622 and ends.

The process of FIG. 6 can be applied to the embodiments of any of FIG. 3, 4 or 5.

Further, the reporting of the CGI may use a new measurement identity and reporting configuration in some embodiments. Reference is made to Table 10 below.

TABLE 10

Section 5.5.2.3 Measurement identity addition/modification
5.5.2.3 Measurement identity addition/modification E-UTRAN applies the procedure as follows:
- configure a measId only if the corresponding measurement object, the corresponding reporting configuration and the corresponding quantity configuration, are configured;
- may add a new measId and a new reportConfig for reporting CGI;
The UE shall:
1> for each measId included in the received measIdToAddModList:
   2> if an entry with the matching measId exists in the measIdList within the VarMeasConfig:
      3> replace the entry with the value received for this measId;
   2> else:
      3> add a new entry for this measId within the VarMeasConfig ;
   2> remove the measurement reporting entry for this measId from the VarMeasReportList, if included;
   2> stop the periodical reporting timer or timer T321, whichever one is running, and reset the associated information (e.g. timeToTrigger) for this measId;
   2> if the triggerType is set to periodical and the purpose is set to reportCGI in the reportConfig associated with this measId:
      3> if the measObject associated with this measId concerns E-UTRA:
         <text omitted>

TABLE 10-continued

Section 5.5.2.3 Measurement identity addition/modification
5.5.2.3 Measurement identity addition/modification 3> else if the measObject associated with this measId concerns UTRA:
<text omitted>
3> else:
    4> start timer T321 with the timer value set to 8 seconds for this measId;

As seen from Table 10, the 3GPP TS 36.331 specification, and in particular section 5.5.2.3 are modified to include a new measurement ID and new reporting configuration for reporting the CGI. The adding of the new measurement ID and reporting configuration are optional but can provide a cleaner transaction and avoid unnecessary measurement interruption by providing a separate reporting configuration and measurement ID for the reporting of the CGI. This could again be implemented with regard to any of the embodiments of FIG. 3, 4 or 5 above.

reportConfig Signaling

In a further alternative embodiment, in order to avoid possible disruption of on-going measurements such as layer 3 filtering in measurement reporting upon configuring the reporting of the CGI, the present embodiment provides for signaling information elements for the cellForWhichToReportCGI in a "report configuration", rather than for a measurement object. In this way, the modification of the existing measurement object can be avoided, thereby avoiding the problems associated with the resetting or the reconfiguration of the measurement object.

The E-UTRAN may add a new reportConfig for reporting the CGI to avoid the possible measurement or measurement reporting disruptions. Alternatively, the E-UTRAN may modify an existing reporting configuration which is or is not associated with the measurement object to be used for reporting the CGI. This may be applicable for all of the GERAN, UTRAN and E-UTRAN.

For example, in E-UTRAN, the physical cell identity may be added to the reportConfig E-UTRA information element. Reference is now made to Table 11 below.

TABLE 11

ReportConfigEUTRA information element
ReportConfigEUTRA information element

```
-- ASN1START
ReportConfigEUTRA ::=            SEQUENCE {
    triggerType                     CHOICE {
        event                           SEQUENCE {
            eventId                         CHOICE {
                eventA1                         SEQUENCE {
                    a1-Threshold                    ThresholdEUTRA
                },
                eventA2                         SEQUENCE {
                    a2-Threshold                    ThresholdEUTRA
                },
                eventA3                         SEQUENCE {
                    a3-Offset                       INTEGER (-30..30),
                    reportOnLeave                   BOOLEAN
                },
                eventA4                         SEQUENCE {
                    a4-Threshold                    ThresholdEUTRA
                },
                eventA5                         SEQUENCE {
                    a5-Threshold1                   ThresholdEUTRA,
                    a5-Threshold2                   ThresholdEUTRA
                },
                ...,
                eventA6-r10                     SEQUENCE {
                    a6-Offset-r10                   INTEGER (-30..30),
                    a6-ReportOnLeave-r10            BOOLEAN
                }
            },
            hysteresis                      Hysteresis,
            timeToTrigger                   TimeToTrigger
        },
        periodical                      SEQUENCE {
            purpose                         ENUMERATED {
                                                reportStrongestCells, reportCGI}
        }
    },
    triggerQuantity                 ENUMERATED {rsrp, rsrq},
    reportQuantity                  ENUMERATED {sameAsTriggerQuantity, both},
    maxReportCells                  INTEGER (1..maxCellReport),
```

TABLE 11-continued

| ReportConfigEUTRA information element | |
|---|---|
| ReportConfigEUTRA information element | |
| reportInterval | ReportInterval, |
| reportAmount | ENUMERATED {r1, r2, r4, r8, r16, r32, r64, infinity}, |
| ..., | |
| [[   si-RequestForHO-r9          Cond reportCGI | ENUMERATED {setup}       OPTIONAL, -- |
| ue-RxTxTimeDiffPeriodical-r9 Need OR | ENUMERATED {setup}       OPTIONAL  -- |
| ]], | |
| [[   includeLocationInfo-r10 OPTIONAL, -- Cond reportMDT | ENUMERATED {true} |
| reportAddNeighMeas-r10 Need OR | ENUMERATED {setup}       OPTIONAL  -- |
| ]], | |
| [[   cellForWhichToReportCGI reportCGI | PhysCellId OPTIONAL,-- Cond |
| ]] | |
| } | |

| ReportConfigEUTRA field descriptions |
|---|
| <rows omitted><br>cellForWhichToReportCGI<br>Indicates the physical cell id for which CGI is reported. This information element<br>overrides cellForWhichToReportCGI if indicated in measObjectEUTRA. |

As seen above, for the E-UTRA, the "cellForWhichToReportCGI" is added to this information element. Further, the information element may override the cell for which to report CGI if indicated in the measObjectEUTRA.

Similarly, for UTRAN and GERAN, the physical cell identity and frequency information (band indicator plus ARFCN) may be added to the reportConfig inter-RAT information element. Reference is now made to Table 12.

TABLE 12

| ReportConfigInterRAT information element | |
|---|---|
| ReportConfigInterRAT information element | |
| -- ASN1START | |
| ReportConfigInterRAT ::= | SEQUENCE { |
|     triggerType | CHOICE { |
|         event | SEQUENCE { |
|             eventId | CHOICE { |
|                 eventB1 | SEQUENCE { |
|                     b1-Threshold | CHOICE { |
|                         b1-ThresholdUTRA | ThresholdUTRA, |
|                         b1-ThresholdGERAN | ThresholdGERAN, |
|                         b1-ThresholdCDMA2000 | ThresholdCDMA2000 |
|                     } | |
|                 }, | |
|                 eventB2 | SEQUENCE { |
|                     b2-Threshold1 | ThresholdEUTRA, |
|                     b2-Threshold2 | CHOICE { |
|                         b2-Threshold2UTRA | ThresholdUTRA, |
|                         b2-Threshold2GERAN | ThresholdGERAN, |
|                         b2-Threshold2CDMA2000 | ThresholdCDMA2000 |
|                     } | |
|                 }, | |
|                 ... | |
|             }, | |
|             hysteresis | Hysteresis, |
|             timeToTrigger | TimeToTrigger |
|         }, | |
|         periodical | SEQUENCE { |
|             purpose | ENUMERATED { |
|  | reportStrongestCells, |
|  | reportStrongestCellsForSON, |
|  | reportCGI} |
|         } | |
|     }, | |
|     maxReportCells | INTEGER (1..maxCellReport), |
|     reportInterval | ReportInterval, |
|     reportAmount | ENUMERATED {r1, r2, r4, r8, r16, r32, r64, infinity}, |
|     ..., | |

TABLE 12-continued

| ReportConfigInterRAT information element |
|---|
| ReportConfigInterRAT information element |

```
[[    si-RequestForHO-r9           ENUMERATED {setup}    OPTIONAL --
Cond reportCGI
]],
[[    reportQuantityUTRA-FDD-r10   ENUMERATED {both}     OPTIONAL --
Need OR
]],
[[    cellForWhichToReportCGIIRAT-r10 CellForWhichToReportCGIIRAT-r10
OPTIONAL -- Cond reportCGI
]]
}
CellForWhichToReportCGIIRAT::= SEQUENCE {
    physCellId-r10              CHOICE {
        utra-FDD                        PhysCellIdUTRA-FDD,
        utra-TDD                        PhysCellIdUTRA-TDD,
        geran                       PhysCellIdGERA
    },
    carrierFreqForWhichToreportCGI   CarrierFreqGERAN    OPTIONAL, -- Need ON
}
```

| ReportConfigIRAT field descriptions |
|---|

<rows omitted>
cellForWhichToReportCGIIRAT
Indicates the physical cell id for which CGI is reported. This information element overrides
cellForWhichToReportCGI if indicated in corresponding measurement object. In case of
GERAN, the frequency carrierFreqForWhichToreportCGI may be indicated.

For Table 12, information regarding the PCI for which to report the CGI may also be added to the information element along with the carrier frequency for which to report the CGI. The carrier frequency would be added in the GERAN case only and not in the UTRAN case as in the UTRAN case there is already a unique frequency in the measurement object.

Figure 7:
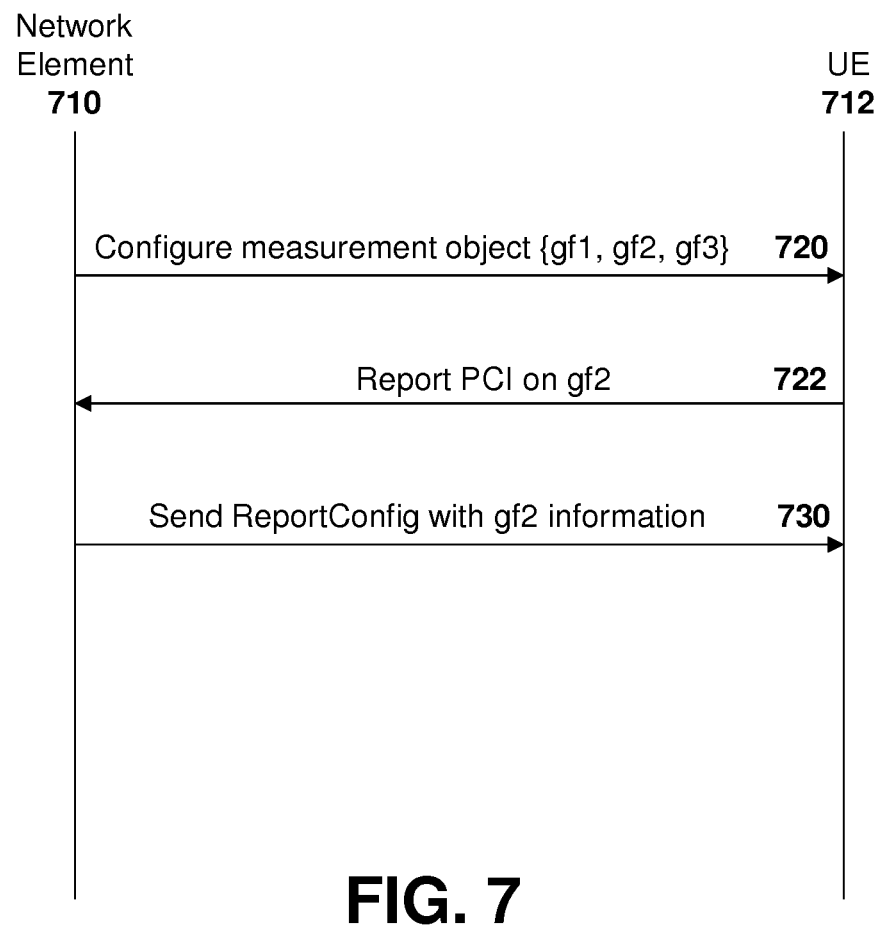
FIG. 7 is a signaling diagram showing the sending of a frequency on a reportConfig message.

Thus, reference is now made to FIG. 7. In FIG. 7 a network element 710 communicates with a UE 712. The network element 710 sends a configuration message shown by arrow 720 indicating the configuration of gf1, gf2 and gf3 as discussed above with reference to FIGS. 2 to 4.

The UE then detects a cell and reports the frequency and the PCI, as shown by arrow 722.

Unlike the solutions above, the network element does not modify the measurement object but instead sends a message containing a reportConfig in which the cellForWhichToReportCGI is provided and adds a new measurement identity, which is sent to link the reportConfig with the measurement object, shown by arrow 730 in FIG. 7.

measConfig for Reporting the CGI

Alternatively, instead of using the reportConfig as identified with regard to the embodiment of FIG. 7 above, the cell for which to report the CGI can be reported in the measurement configuration. In accordance with section 5.2.2 of the 3GPP TS 36.331 specification, the E-UTRAN guarantees that anytime a UE is acquiring CGI information, it is doing so for only one cell. However, the current specification unnecessarily allows multiple measurement objects to have the cellForWhichToReportCGI configured. Thus, multiple reporting configurations may have a purpose set to reportCGI.

Instead, by signaling the cellForWhichToReportCGI in the measurement configuration, the rule for reporting only one CGI at a time can be enforced by the protocol itself.

Further, by using the measurement configuration instead of a measurement object, the modification of measurement objects is avoided, thus avoiding the issues identified above.

Reference is now made to Table 13, which shows the additional information added to a 3GPP TS 36.311 measConfig information element.

TABLE 13

| MeasConfig information element |
|---|

```
-- ASN1START
MeasConfig ::=                      SEQUENCE {
    -- Measurement objects
    measObjectToRemoveList               MeasObjectToRemoveList
                        OPTIONAL, -- Need ON
    measObjectToAddModList               MeasObjectToAddModList
                        OPTIONAL, -- Need ON
    -- Reporting configurations
    reportConfigToRemoveList             ReportConfigToRemoveList
                        OPTIONAL, -- Need ON
    reportConfigToAddModList             ReportConfigToAddModList
                        OPTIONAL, -- Need ON
```

TABLE 13-continued

| MeasConfig information element | |
|---|---|
| ``` |
-- Measurement identities
measIdToRemoveList                              MeasIdToRemoveList
                OPTIONAL,  -- Need ON
measIdToAddModList                              MeasIdToAddModList
                OPTIONAL,  -- Need ON
-- Other parameters
quantityConfig                                  QuantityConfig
                OPTIONAL,  -- Need ON
measGapConfig                                   MeasGapConfig
                        OPTIONAL,  -- Need ON
s-Measure                                       RSRP-Range
                OPTIONAL,  -- Need ON
preRegistrationInfoHRPD                         PreRegistrationInfoHRPD
                OPTIONAL,  -- Need OP
speedStatePars          CHOICE {
    release                                             NULL,
    setup
SEQUENCE {
        mobilityStateParameters
MobilityStateParameters,
        timeToTrigger-SF
SpeedStateScaleFactors
    }
}
                                        OPTIONAL,   -- Need ON
...,
[[      cellForWhichToReportCGIIRAT CellForWhichToReportCGIIRAT
OPTIONAL -- Cond reportCGI
]]
}
CellForWhichToReportCGIIRAT::= SEQUENCE {
    physCellId      CHOICE {
        eutra           PhysCellId,
        utra-FDD                                PhysCellIdUTRA-FDD,
        utra-TDD                                PhysCellIdUTRA-TDD,
        gera            PhysCellIdGERA
    },
    carrierFreqForWhichToreportCGI    CarrierFreqGERAN    OPTIONAL, -- Need
ON}
``` | |

As seen in the table above, when requesting the UE to report the CGI, the E-UTRAN may add an instance of a reporting configuration with a purpose set to reportCGI and set the additional information in the measurement configuration to specify the target cell. Alternatively, the network may modify existing instances of reporting configurations which are not associated with the measurement object to be used for reporting the CGI.

In yet another embodiment, the network may set the CellForWhichToReportCGIIRAT in measurement configuration with a reserved measurement identity for CGI reporting. The reserved measurement identity is not linked to a measurement object or a reporting configuration.

Figure 8:
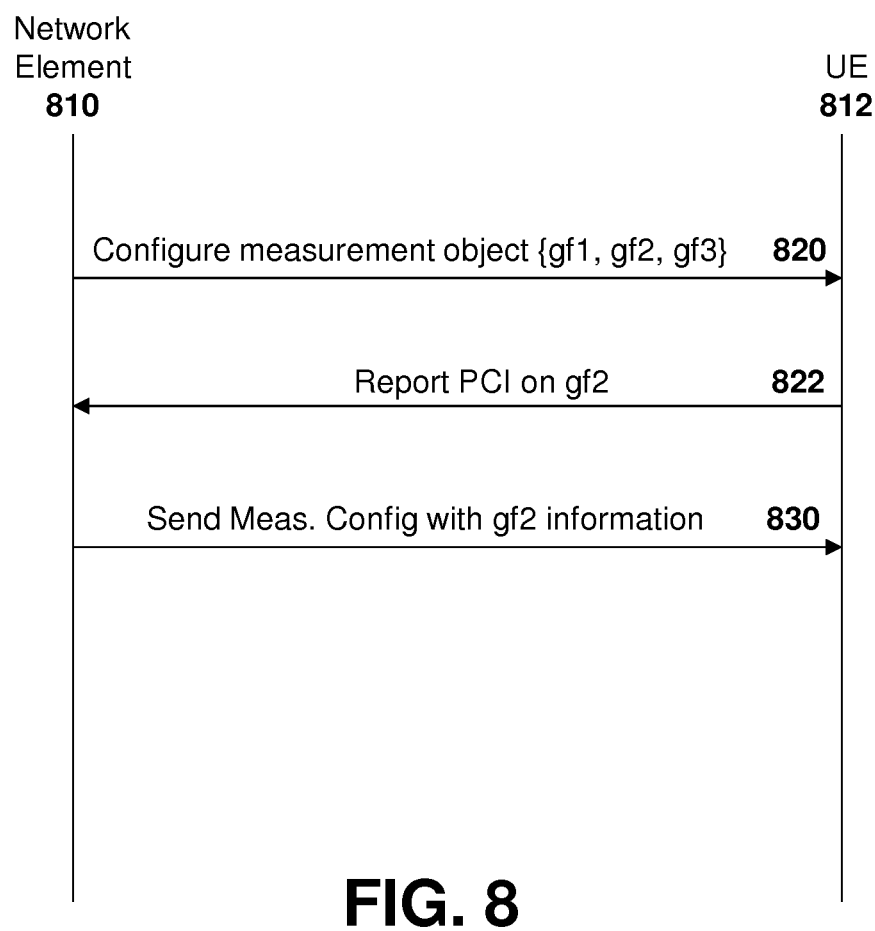
FIG. 8 is a signaling diagram showing the sending of a frequency on a measurement configuration message.

Reference is now made to FIG. 8 which shows example signaling between a network element 810 and a user equipment 812. The network element 810 configures a measurement object and in the example of FIG. 8 configures three GERAN frequencies, namely gf1, gf2 and gf3, as shown in arrow 820.

UE 812 detects a cell on gf2 and reports the PCI of the cell, as shown by arrow 822.

Instead of reconfiguring the measurement object, if the network element wants the CGI associated with the PCI received at arrow 822, the network element may send a measurement configuration in which the frequency may be provided for reporting the CGI. For example, the ARFCN associated with gf2 may be provided as part of the measurement configuration. This is shown by arrow 830 in FIG. 8.

With any of the above, the FGI bit, for example FGI bit 34, may be toggled to indicate whether or not the UE has adopted the embodiments described herein. Thus if the bit is toggled, the UE may accept the modified measurement object, reportConfig, or measurement config messages. Conversely, if the bit is not toggled, this may signal to the network that the UE uses an older version of the LTE specification and thus not to utilize the embodiments described above. More generally some other method could be used to allow the E-UTRAN to know whether UE has implemented one of the above methods, e.g. a capability indication or a release indicator.

The above may be implemented by any network element. A simplified network element is shown with regard to FIG. 9. The network element of FIG. 9 may be an eNB or other network element, including network elements 210, 310, 410, 710 or 810, among others.

Figure 9:
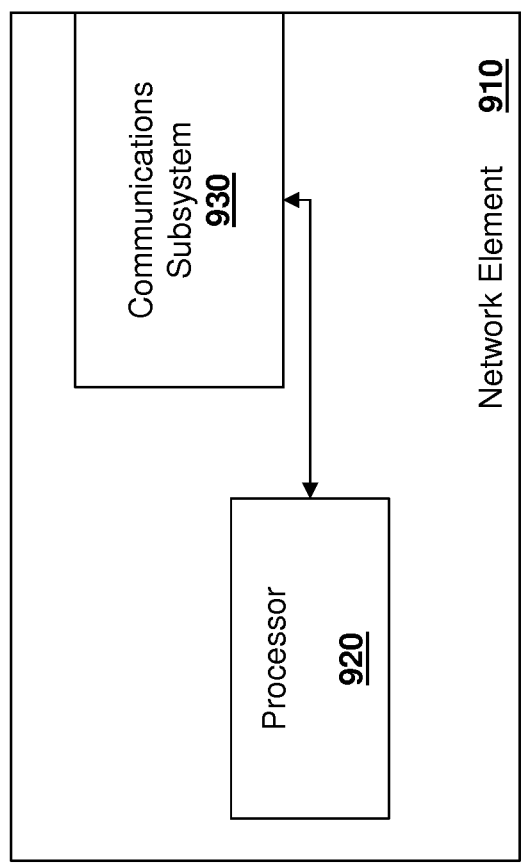
FIG. 9 is a block diagram of a simplified example network element.

In FIG. 9, network element 910 includes a processor 920 and a communications subsystem 930, where the processor 920 and communications subsystem 930 cooperate to perform the methods described above.

Further, the above may be implemented by any UE. One exemplary device is described below with regard to FIG. 10.

UE 1000 is typically a two-way wireless communication device having voice and data communication capabilities. UE 1000 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1000 is enabled for two-way communication, it may incorporate a communication subsystem 1011, including both a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate. The radio frequency front end of communication subsystem 1011 can be any of the embodiments described above.

Network access requirements will also vary depending upon the type of network 1019. In some networks network access is associated with a subscriber or user of UE 1000. A UE may require a removable user identity module (RUIM) or a subscriber identity module (SIM) card. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information.

Figure 10:
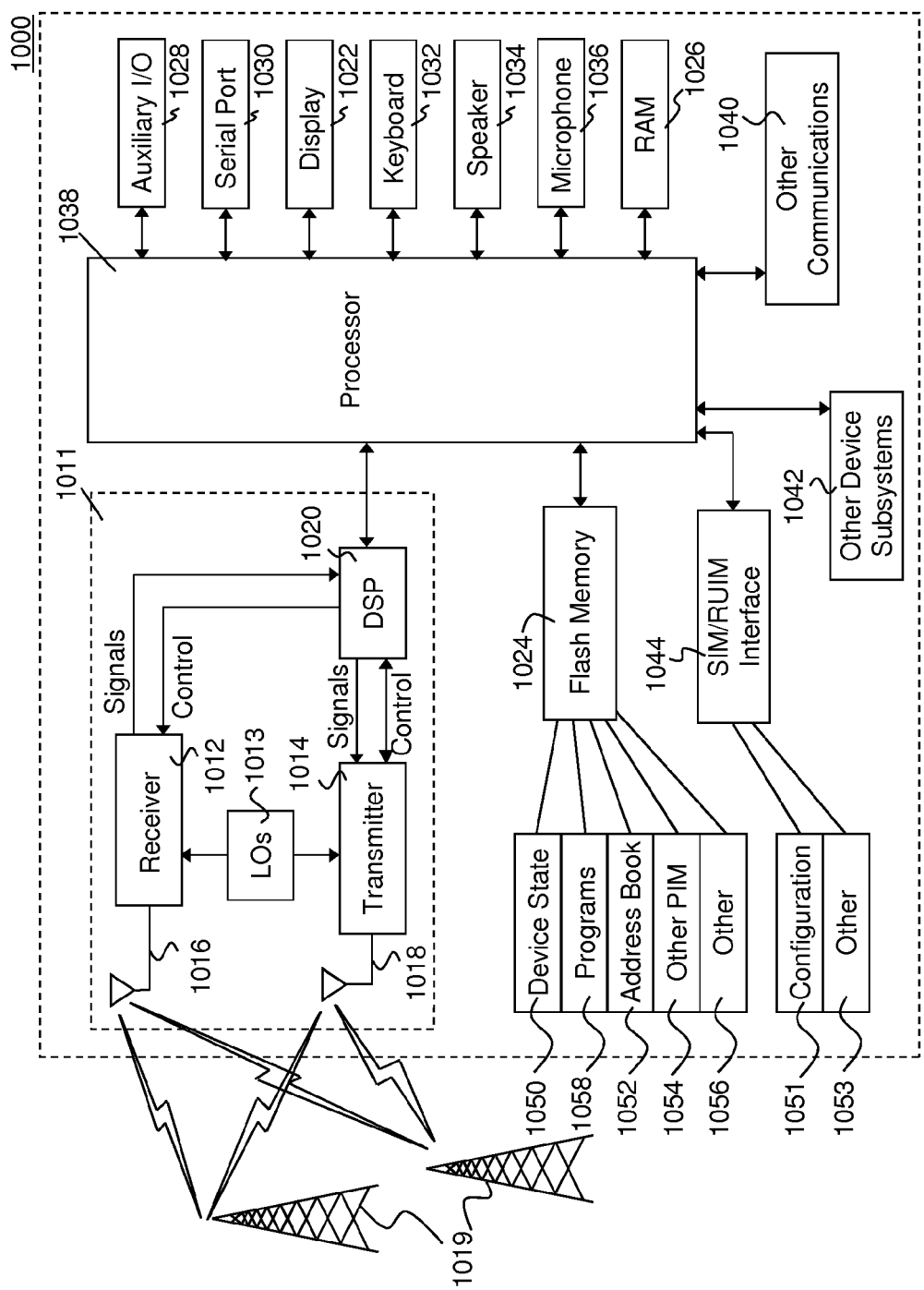
FIG. 10 is a block diagram of an example user equipment capable of being used with the embodiments of the present disclosure.

When required network registration or activation procedures have been completed, UE 1000 may send and receive communication signals over the network 1019. As illustrated in FIG. 10, network 1019 can consist of multiple base stations communicating with the UE.

Signals received by antenna 1016 through communication network 1019 are input to receiver 1012, which may perform such common receiver functions as signal amplification, frequency down conversion, filtering, channel selection and the like. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

UE 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the UE. A predetermined set of applications that control basic operations, including at least data and voice communication applications for example, will normally be installed on UE 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1019. Further applications may also be loaded onto the UE 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the UE 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of UE 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of UE 1000 is similar, except that received signals would typically be output to a speaker 1034 and signals for transmission would be generated by a microphone 1036. Alternative voice or audio I/O subsystems, such as a voice message recording subsystem, may also be implemented on UE 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type UE for which synchronization with a user's desktop computer (not shown) may be desirable, but is an optional device component. Such a port 1030 would enable a user to set preferences through an external device or software application and would extend the capabilities of UE 1000 by providing for information or software downloads to UE 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the UE to a computer to act as a modem or for charging purposes.

Other communications subsystems 1040, such as a short-range communications subsystem, is a further optional component which may provide for communication between UE 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WiFi or WiMAX, or near field communications (NFC), among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment comprising:
   receiving, at the user equipment, a measurement object from a network element for modifying an existing measurement object at the user equipment, the received measurement object defining at least one carrier frequency on which the user equipment is to perform measurements;
   if the received measurement object is modified only to configure cell global identifier reporting, maintaining at least one of a measurement reporting entry, associated timers and any associated information; and
   if the received measurement object is modified other than to only configure cell global identifier reporting, removing the measurement reporting entry, stopping any associated timers and resetting said any associated information.

2. The method of claim 1, wherein the received measurement object contains an information element to configure cell global identifier reporting.

3. The method of claim 1, wherein the received measurement object contains an explicit indication for a frequency for reporting the cell global identifier.

4. The method of claim 3, wherein the explicit indication is a field within an information element for the received measurement object.

5. The method of claim 4, wherein the explicit indication is an index value.

6. The method of claim 3, wherein the received measurement object contains an implicit indication for a frequency for reporting the cell global identifier.

7. The method of claim 6, wherein the implicit indication uses an ordering of frequencies within the measurement object.

8. The method of claim 7, wherein the implicit indication is a frequency at a start of a list of frequencies.

9. The method of claim 6, wherein the implicit indication is a starting frequency value.

10. The method of claim 1, further comprising receiving a new measurement identifier and reporting configuration for reporting the cell global identifier from the network element.

11. A user equipment comprising:
    a processor, and
    a communications subsystem,
    wherein the user equipment is configured to:
       receive a measurement object from a network element for modifying an existing measurement object at the user equipment, the received measurement object defining at least one carrier frequency on which the user equipment is to perform measurements; and
       if the received measurement object is modified only to configure cell global identifier reporting, maintain at least one of a measurement reporting entry, associated timers and any associated information; and
       if the received measurement object is modified other than to only configure cell global identifier reporting, remove the measurement reporting entry, stop any associated timers and reset said any associated information.

12. The user equipment of claim 11, wherein the received measurement object contains an information element to configure cell global identifier reporting.

13. The user equipment of claim 11, wherein the received measurement object contains an explicit indication for a frequency for reporting the cell global identifier.

14. The user equipment of claim 13, wherein the explicit indication is a field within an information element for the received measurement object.

15. The user equipment of claim 14, wherein the explicit indication is an index value.

16. The user equipment of claim 11, wherein the received measurement object contains an implicit indication for a frequency for reporting the cell global identifier.

17. The user equipment of claim 16, wherein the implicit indication uses an ordering of frequencies within the measurement object.

18. The user equipment of claim 17, wherein the implicit indication is a frequency at a start of a list of frequencies.

19. The user equipment of claim 16, wherein the implicit indication is a starting frequency value.

20. The user equipment of claim 11, further comprising receiving a new measurement identifier and reporting configuration for reporting the cell global identifier from the network element.

* * * * *